United States Patent [19]

Donohue et al.

[11] Patent Number: 4,901,472
[45] Date of Patent: Feb. 20, 1990

[54] METHOD AND APPARATUS FOR THE PROTECTION OF CITRUS TREES FROM FROST DAMAGE

[76] Inventors: Thomas P. Donohue, 107 Lindoo Ave.; Richard L. Nash, 120-½ E. Fritz, both of Ladysmith, Wis. 54848

[21] Appl. No.: 245,891
[22] Filed: Sep. 16, 1988
[51] Int. Cl.⁴ .............................................. H01G 13/00
[52] U.S. Cl. ............................................. 47/2; 47/26; 47/22; 47/23; 126/263
[58] Field of Search .................. 47/2, 26, 28, 20, 21; 126/263

[56] References Cited

U.S. PATENT DOCUMENTS

| | | | |
|---|---|---|---|
| 1,434,576 | 11/1922 | Wertheimer | 126/263 |
| 1,747,967 | 2/1930 | Bell | 47/28 R |
| 1,819,807 | 8/1931 | Baysinger | 44/328 |
| 1,901,313 | 3/1933 | Mann | 44/3.8 |
| 1,910,874 | 5/1933 | Kiegler et al. | 44/3.8 |
| 2,157,169 | 5/1939 | Foster | 126/263 |
| 2,573,791 | 11/1951 | Howells | 128/82.1 |
| 2,665,523 | 1/1954 | Hardman | 47/28 R |
| 2,680,063 | 6/1954 | Shapiro | 44/3.6 |
| 3,301,250 | 1/1967 | Glasser | 126/263 |
| 3,354,579 | 11/1967 | Gross et al. | 47/2 |
| 3,470,863 | 10/1969 | Payne | 126/59.5 |
| 3,563,461 | 2/1971 | Cole | 239/9 |
| 3,706,160 | 12/1972 | Diebert | 47/21 |
| 3,791,069 | 2/1974 | Nelson | 43/69 |
| 3,830,014 | 8/1974 | Baker | 47/1.7 |
| 3,842,536 | 11/1984 | Schick | 47/2 |
| 3,964,465 | 6/1976 | Diggs | 126/350 B |
| 3,976,049 | 8/1976 | Yamashita | 126/263 |
| 4,006,561 | 2/1977 | Thoma et al. | 47/58 |
| 4,018,003 | 4/1977 | Mirecki | 47/26 |
| 4,080,953 | 3/1978 | Mitchell et al. | 126/263 |
| 4,205,685 | 6/1980 | Yoshida et al. | 128/399 |
| 4,230,105 | 10/1980 | Harwood | 128/156 |
| 4,265,049 | 5/1981 | Gorawitz | 47/26 |
| 4,267,665 | 5/1981 | Wallace et al. | 47/26 |
| 4,341,039 | 7/1982 | Reese | 47/24 X |
| 4,366,804 | 1/1983 | Abe | 126/263 |
| 4,434,345 | 2/1984 | Muscatell | 219/10.55 R |
| 4,614,055 | 9/1986 | Day | 47/2 |
| 4,646,467 | 3/1987 | Morrisroe | 47/21 |
| 4,651,465 | 3/1987 | Lilly | 47/2 |

OTHER PUBLICATIONS

Yelenosky, Self Heating Tree Wraps in Freeze Protection, Proc. Fla. State Hort. Soc., 92:1979, pp. 25-26.
Yelenosky, A New Insulator Wrap to Protect Young Citrus Trees during Freezes, Hortscience, vol. 16(1), Feb. 1981, pp. 44-45.
Jackson et al., Performance of Individual Tree Covers for Cold Protection of Young Citrus Trees; Proc. Fla. State Hort. Soc., 99:18-23, 1986.
Horanic et al., Electrostatic Heating of Citrus Trees, Pro. First INat'l, Citrus Sympos.; vol. 2, 1969, pp. 539-544.
Reuther, The Citrus Industry, vol. III, Chapter 10; Frost Protection Technology, pp. 338, 353, 356-359, 365, 369-373, 378-379, 384.
Parsons, Soil's Heat Protects Trees; Popular Mechanics; Aug. 1987; page unknown.

Primary Examiner—Robert A. Hafer
Assistant Examiner—Lynda M. Cofsky
Attorney Agent, or Firm—Moore & Hansen

[57] ABSTRACT

A frost protective device for citrus trees having a pad of thick, dark colored, water repellent urethane foam which may be wrapped in a cylinder around the budunion or branch of a citrus tree and secured in position using Velcro ® or a similar fastener. Each protective device has a plurality of insulated pockets which receive individual exothermic heat sources such as drychemical warmers capable of producing high temperatures for a period of 1-3 days.

To protect young trees from high initial temperatures and prolong the effective duration of the heat sources, other measures are utilized in combination with the protective device. One measure is controlling the exposure of the dry chemical packet to oxygen by varying the air flow properties of the insulating pocket or the air-tight wrapper initially enclosing the heat source, thereby regulating the resulting oxidation. Another measure consists of placing an insulating jacket of liquid-filled tubes between the heat sources and the tree, so that the liquid absorbs the excess initial heat and acts as a regulator and insulator for the transfer of subsequent heat to the tree, thereby preventing initial heat damage, conserving initial heat energy, absorbing and releasing that heat energy to prolong the effective usefulness of heat sources, and providing backup protection due to the potential heat of fusion of the liquid.

27 Claims, 2 Drawing Sheets

METHOD AND APPARATUS FOR THE PROTECTION OF CITRUS TREES FROM FROST DAMAGE

BACKGROUND OF THE INVENTION

This invention relates generally to devices for protecting orchards of citrus trees from frost damage, and particularly to an apparatus and method for protecting the budunion of individual citrus trees from frost damage as well as other hazards.

The field of art surrounding frost protection of citrus orchards has become very well developed, although uniformly effective and cost efficient solutions have remained beyond the present grasp of the industry despite the magnitude of the problem. Damage due to frost, particularly when the trees are severely damaged or killed rather than merely affecting ripening fruit, can present both an immediate economic setback as well as devastating long term reductions in regional productivity. Catastrophic frost conditions in Texas during December of 1983, as well as four major freezes between 1981 and 1985 in Florida, have taken an estimated immediate toll of $2-3 billion in citrus trees in well over 300,000 acres, and those states have yet to regain the use of over 50% of that lost acreage.

Recurring frosts of that magnitude can be expected to occur sporadically every 1-2 decades, although minor seasonal frosts can damage several hundred acres at a time in an individual orchard at costs exceeding $10,000 per acre, and trouble spots such as low-lying ground or cold pockets can be repeatedly struck with frosts each year. Consequently, growers will often allocate up to $1,500 per acre purely for frost protection, at an average of 120-150 citrus trees per acre.

The many methods of frost protection can be roughly categorized, although various texts and publications have attempted to provide a more scientific cataloguing of the devices available to citrus growers and the relative merits and drawbacks of each. Some of the common considerations in evaluating frost protection devices and methods include material and labor costs, durability and reuse, adaptability, efficiency, effectiveness and operating ranges, state regulations, and detrimental side effects such as pollution or operating hazards.

Orchard heaters are a fundamental form of frost protection for all types of orchards. The heaters may comprise individual "smudge pots" which are placed surrounding the trees and produce radiant heat, or heat blowers or canopy heaters which warm and control the circulation of the air within an orchard.

Several types of oil-fueled heating devices are known, variously termed return stack, pipe line, jumbo cone, lemora, straight stack, lazy flame, and internal exchange heaters as examples. See, W. Reuther, The Citrus Industry Vol.III, U.Cal.Div.Ag.Sci. (1973) at pp. 338 et.seq., LCC-67-63041. One example of such an interconnected smudge pot system is disclosed in U.S. Pat. No. 3,470,863 to Payne. Solid fuel heaters are also known, varying in type from coal baskets to briquettes, wax candles, and reusable petroleum coke bricks. See Reuther, supra, at 359. A disclosure of an improved method for producing radiant heat from a two part flameless combustible oxidizing solid fuel source, as well as a discussion of the various heat sources listed above, may be found in U.S. Pat. No. 3,842,536 to Schick.

It is significant to note that the temperature increases discussed in the Schick '536 patent are in the range of 1°-6° F. during a period up to four hours after ignition. Maintaining citrus trees in frost conditions at or slightly below the freezing point of water (32° F.), or alternately producing temperature increases of less than 10° F., has generally been considered the criteria for a successful product. The USDA regards maintaining a temperature of 20° F. for a period of four hours as satisfactory to qualify a product as a frost protective device.

More elaborate heating devices have also been devised, such as the combination heater and vapor generator disclosed in U.S. Pat. No. 3,964,465. Heaters, artificial fogs, microsprinklers, and air channeling devices, living and non-living windbreaks, chemical reagents and bioengineered frost preventative preparations have proven effective in many frost situations, but are subject to failure in winds or non-advective frosts and produce less than marginal guarantees of protection from abnormal or catastrophic frosts.

Heaters are effective when a forced temperature inversion can be maintained within an area of an orchard, but it is more frequently desired to reverse a natural temperature inversion and create turbulence in the air to mix and transport both cold and warm air, thereby helping to prevent sublimation on foliage or fruit. See Reuther, supra. Consequently, wind generating machines have been adopted particularly on the west coast to create turbulence or convection, and have been used in combinations with various types of heaters. Conversely, because foliage is a particularly poor heat conductor, another attempted procedure is to place a canopy over individual trees for retaining generated heat. Examples of such canopies may be seen in U.S. Pat. Nos. 3,830,014 to Baker and 3,706,160 to Delbert. These fabric canopies may be deployed using an articulated vehicle such as shown in U.S. Pat. No. 3,791,069 to Nelson, or a system of piping used for irrigation and pesticide application can also be used to produce a foam canopy such as disclosed in U.S. Pat. No. 3,563,461 to Cole.

More complex systems of heating areas of an orchard include the microwave system of U.S. Pat. No. 4,434,345 to Muscatell, an underground conduit system for delivering smudge, water, fertilizers and pesticides as disclosed in U.S. Pat. No. 3,354,579 to Gross, or the electrostatic heating of citrus trees as discussed by G.E. Horanic and G. Yelenosky in Proc.First.Int'l.Citrus.-Symp., Vol. 2 (1969) p. 539 et.seq. See also Reuther, supra.

Such larger heat generating and environmental control systems are initially quite expensive to purchase and maintain, are labor and fuel intensive, are subject to state regulation, and still provide uncertain protection in many instances. The chief advantages are that larger systems can be used to produce widely varying BTUs depending on the needs of the regional climate, at the higher ranges a proportional increase in BTU production is relatively cost effective, the systems will generally operate for many years without replacement so that they may be amortized, and the expense of the systems may be reflected in decreased insurance premiums.

It has become more popular in recent years to provide for the protection of individual trees, particularly since research has shown substantial benefits in protecting the more fragile budunion (the graft junction between the scion which is necessary to continued propagation and the more resilient root stalk which conveys disease resistance and other benefits) during the early formative years of a tree's growth. Damage to the budunion can result in loss of the entire tree, and thereby the several years necessary to raise a tree to the same level of development from a seedling.

Many types of tree wraps have been utilized in the past, including plant products such as rice straw, corn stalks, palm leaves, and other insulating materials. Man-made insulative products including fabrics and artificial fibers, styrofoams and polystyrenes, thin plastic films or resinous sheets, asphalt-felt, and metallic foils have been among the products produced commercially. Examples of such individual packaging materials for small plants are disclosed in U.S. Pat. Nos. 4,646,467 to Morrisroe, 4,265,049 to Gorawitz, and 4,006,561 to Thoma. See also Reuther, supra. Banking soil or mineral compositions at the bottom of young trees to provide insulation and wind protection is also utilized by some growers. More resilient plastic sheeting or collars are known, such as the plastic tree band disclosed in U.S. Pat. No. 3,333,361, and the double-faced corrugated plastic material marketed by the South Bay Co. and the single faced two-tone corrugated protective wraps manufactured by the Diversi-Plast Co. of Minneapolis, Minnesota.

Small plants have been individually covered using devices termed "hot caps," representative examples of the various types of hot caps being shown in U.S. Pat. Nos. 1,747,967 to Bell, 2,665,523 to Hardman, and 4,018,003 to Mirecki. Such hot cap devices are of limited value for use in the case of trees, either being too small to accommodate a developed tree, too inflexible to be used with a rapidly growing tree, and not providing significant insulation against cold temperatures.

Some of the more effective developments in protecting citrus trees have involved conducting heat from an isolated source to individual trees. Examples of such systems are disclosed in U.S. Pat. No. 4,614,055 to Day wherein heated water is circulated throughout an orchard via a series of interconnected manifolds wrapped around the trunks of the individual trees, and U.S. Pat. No. 4,651,465 to Lilly in which tubing circulating heated water is positioned adjacent to the tree trunks within cylindrical thermal barriers surrounding the trunks and forming substantially sealed air spaces.

These systems can be utilized to keep the individual budunions warm, although the systems are complicated to install, require pumps for water circulation as well as heating units, are difficult to reposition as young trees develop, require replacing thermal barriers and caps, and are themselves subject to freezing, leaking, and other failures.

One experimental effort to obviate these problems has been to place a metal rod deep in the soil with the upper end wrapped against the tree trunk with foil-coated insulation. The metal rod extracts and conducts a small amount heat from the soil which is normally near 50° F., thus providing an approximately temperature increase of 3°-7° F. at the trunk of the tree. While this system is relatively inexpensive and requires only minimal maintenance, the thermal protection which is provided is also of marginal value.

The protection of individual trees is also important to homeowners and gardeners as well as commercial growers. It is not uncommon for people to spend one or two hours covering a few small citrus trees in anticipation of cold weather or a frost, and homeowners are willing to devote far more time and expense to protecting their larger developed trees, since their cost of replacement is significantly higher than commercial growers, and the available methods of protecting individual trees are substantially limited. Another recent and very popular development is the Reese Wrap disclosed in U.S. Pat. No. 4,341,039 to Reese and discussed by Yelenosky in HortScience, Vol. 16(1) p. 44 et.seq. (February 1981) and Proc.Fla.S.Hort.Soc. 92:25-27 (1979). The Reese Wrap comprises an outer cover molded from an insulating material such as polystyrene enclosing a pack of water filled tubes which surround the tree trunk. In theory, the approximately 0.5 liters of water contained within the water pack will release 36 Kcal. of heat when freezing at 32° F. due to the molar heat of fusion of water.

The stability or cold resistance of citrus trees varies depending upon the type of tree, its planting condition, and the type of frost. In general, temperatures of 32° F. and below are required in order to produce clinging frost or direct damage to the tree due to internal freezing, however the safe temperature margin for protecting orange and grapefruit trees can often be very narrow. Most varieties of developed orange trees can withstand temperatures of 28°-29° F. for an indefinite period, while temperatures of 25°-26° F. can cause severe damage within 3-6 hours and complete loss in 8 hours. Young seedlings or developing trees are far more fragile, and may be subject to complete loss at 32° F. Moreover, it is often difficult to calculate the virtual temperature at the bark surface since moisture, ground and wind conditions may have a substantial influence.

In practice, the Reese Wrap has not proven completely effective, particularly in situations of extreme cold and rapid temperature drops. The addition of silver iodide or phenazine to the water as an ice seeding catalyst has proven helpful in combating the problem of supercooling during a strong freeze (although the increase in molarity causes a proportional decrease the the actual freezing temperature of the water) but the margin for error at temperatures near or slightly below freezing is extremely small for many tree varieties. Moreover, the Reese '039 patent suggests that a typical device could only produce sufficient heat to prevent tree damage for 13 hours, while Yelenosky, supra, states that 20 hours of protection can be afforded at non-critical temperatures. Once the water is frozen, however, the ability of this product to further protect the tree is reduced dramatically, and damage may be caused by pressure from the frozen water if the wrap is misapplied, not removed promptly, leaks, or acts as a catalyst to freezing or sublimation of the surrounding water vapor. If the temperature of the wrap rises very gradually, particularly due to increased sunshine rather than increased air temperatures, the frozen water can actually lower the temperature of the tree as the water reabsorbs the same quantity of heat of sublimation upon melting, thereby increasing the time the tree is subject to damage. The frozen wrap can be difficult to adjust or remove in order to prevent these problems. Finally, the Reese Wrap is very difficult to use in connection with larger or developed trees, since the molded insulators limit the application of the wrap to larger trunks and branches.

The use of water both as an insulator from the surrounding cold air and as an exothermic heat source due to the release of the thermal energy of fusion during freezing was known prior to the Reese '039 patent, representative examples of similar applications being shown in U.S. Pat. Nos. 4,267,665 and 4,137,667 to Wallace. Water filled jackets or covers are more effective in the case of small plants which do not transfer and dissipate heat upwardly as quickly as trees, which can be fully enclosed so as not to be subject to advective air conditions, and which do not require contact between the plant and water filled jacket.

BRIEF SUMMARY OF THE INVENTION

It is therefore one object of this invention to design a protective device to be applied to individual citrus trees, particularly to protect the budunion, which will be effective against severe frosts of any type and extreme cold temperatures for periods exceeding one day.

It is a related object of this invention to design the above protective device such that it may be applied to many varieties and sizes of trees in various stages of development, and may therefore be quickly adjusted or adapted to varying conditions.

It is a further object of this invention to design the above protective device such that an individual exothermic heat source may be utilized in combination with certain traditional frost protection techniques to extend the effective duration of the protection afforded by the exothermic heat source and therefore the device.

It is yet another object of this invention to design the above protective device such that it is inexpensive to manufacture, and such that the individual exothermic heat source may be replenished or replaced easily and inexpensively.

It is one more object of this invention to design the above protective device such that through various modifications the effective duration of the exothermic heat source itself may be extended into the range of three days.

It is an additional object of this invention to design the above protective device such that it is effective in protecting young trees from insects and rodents, will not cause or promote rotting or mildew, will deter premature budding, and provide protection from physical damage by orchard equipment and personnel.

Briefly described, the protective device of this invention comprises a pad of thick, dark colored, water repellent urethane foam which may be wrapped in a cylinder around the budunion or branches of a citrus tree and secured in position using velcro or a similar fastener. Each protective device has a plurality of insulated pockets or pouches attached to the inside surface of the pad which may receive and enclose individual exothermic heat sources capable of producing high temperatures for a period of 1-3 days. One preferred exothermic heat source is a dry chemical packet containing specified quantities of iron powder, activated carbon, ferric sulfate, water, cellulose, and mica which produces heat upon exposure to air and oxidation.

Because of the high initial temperatures which can be produced using the protective device and exothermic heat source, further means to protect the young citrus trees and to prolong the effective duration of the heat sources may be utilized. One means is by controlling the exposure of the dry chemical packet to oxygen by varying the air flow properties of the insulating pocket or the air-tight wrapper initially enclosing the heat source, thereby regulating the resulting oxidation and extending the time of heat production while reducing the maximum temperature. Another means is by placing an insulating jacket comprised of liquid filled tubes between the heat sources and the tree, so that the liquid absorbs the excess initial heat and acts as a regulator and insulator for the transfer of subsequent heat to the tree, thereby preventing initial heat damage, conserving excess initial heat energy, absorbing and releasing that heat energy to prolong the effective usefulness of the heat sources, and providing backup protection due to the potential heat of fusion of the liquid.

DESCRIPTION OF THE PREFERRED EMBODIMENT

The protective device for citrus trees of this invention is shown in FIGS. 1-6 and referenced generally therein by the numeral 10.

Figure 1:
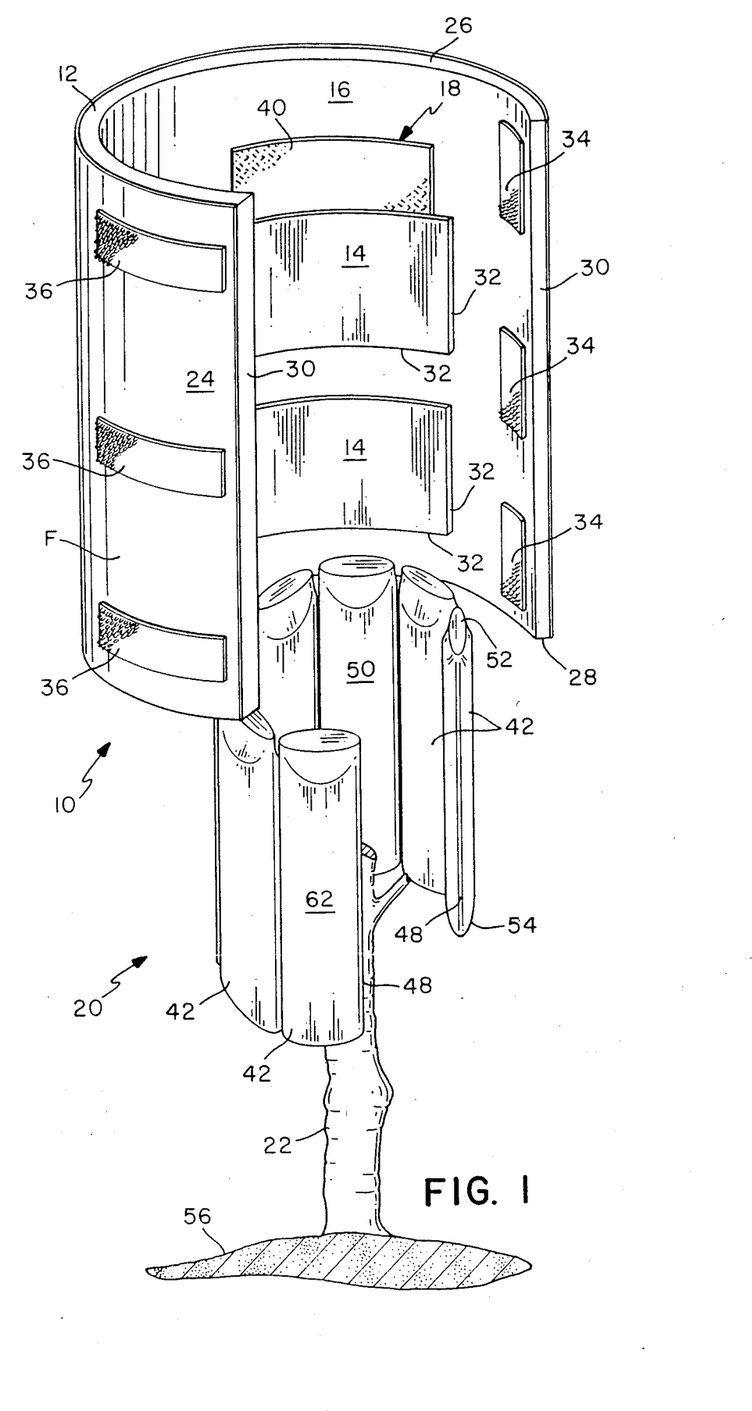
FIG. 1 is an exploded perspective view showing the insulating jacket and protective pad with exothermic heat sources of this invention being wrapped around a citrus tree.
Figure 2:
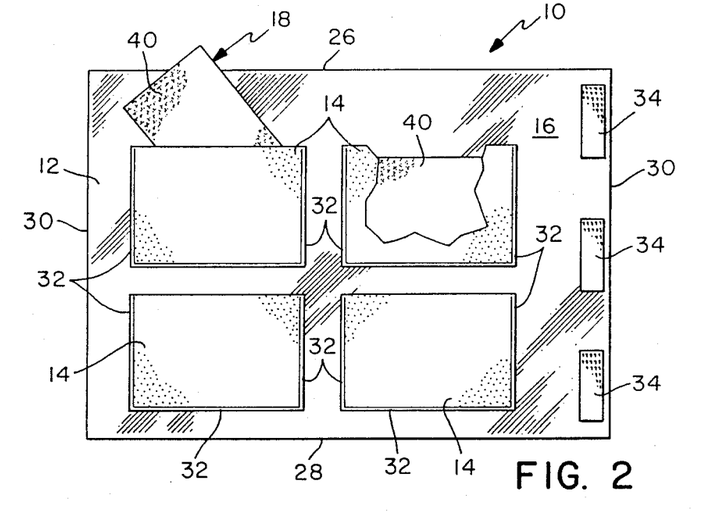
FIG. 2 is a front elevation view of the inside surface of the protective pad of FIG. 1.

Referring particularly to FIG. 1, it may be seen that the protective device 10 comprises an outer protective pad 12 having a plurality of pockets or pouches 14 attached parallel and adjacent to or otherwise formed by the inner face 16 of the protective pad 12 at predetermined locations, each pocket 14 having an enclosed region and an open region being capable of receiving a self-contained exothermic heat source and an insulating jacket 20 which may be wrapped concentrically surrounding a trunk of a citrus tree 22 in the region of the budunion, or the branches or limbs of a larger developed tree 22. Referring to FIGS. 1 and 2, the protective pad 12 may be fabricated from any insulating sheet material such as a black urethane-polyester having a thickness of approximately ¼" and a density of approximately 2.0 PCF (or 0.037 gm/cm$^3$) coated on the exterior side 24 opposing the inner side 16 with a moisture-proof or moisture repelling material such as a 0.0015" black urethane protective film F. The protective pad 12 preferably has a height measured between the top edge 26 and bottom edge 28 of at least 10" or more, and a length measured between the first and second opposing end edges 30 of at least 12" to permit the pad to be wrapped around the circumference of a 3" tree and secured along an overlapping portion of the opposing end edges 30.

The pockets or pouches 14 may be formed from any one of a variety of air permeable synthetic foam sheet materials depending upon the particular air flow and insulation properties which are desired. A ⅛"-¼" thick open celled urethane-polyester or urethane-polyether having a density of 2.0 PCF will provide substantial airflow and suitable insulation, while a ⅛" thick closed-cell polyethylene having a density of 2.2 PCF will greatly reduce airflow and provide a proportional degree of insulation.

The pockets 14 are attached directly to the inner surface 16 of the pad 12 along three adjoining edges 32 using a suitable adhesive or other fastening means such as sonic welding to form a generally enclosed area, leaving the fourth edge 32 open to permit at least a portion of the exothermic heat source 18 to be slidably received within the pocket 14 through that open edge 32 and between the pocket 14 and protective pad 12. The open edge 32 may be any of the edges 32 of the pocket 14, with an open side edge 32 having proven more effective in retaining heat otherwise lost upwardly, but an open top edge 32 being more convenient for placement and replacement of the exothermic heat sources 18. The pockets 14 may alternately be formed directly by layering or slitting the material used to form the protective pad 12, such that the pockets 14 are integrally formed by and remain parallel and adjacent to the inner surface 16 of the protective pad 12.

The protective pad 12 may be secured surrounding the tree 22 using any suitably fastening means, including a fastener such as Velcro ® having a cooperating hook tab 34 and loop tab 36 which adhere to one another on contact and may be pulled apart easily. The hook and loop tabs 34, 36 should have a length greater than their width, with one of the hook or loop tabs 34, 36 being attached to the inner surface 16 of the pad 12 and oriented in a generally vertical direction proximate to one of the side edges 30 thereof, with the other hook or loop tab 34, 36 being attached to the external face 24 of the pad 12 and oriented in a generally horizontal direction extending inwardly from the opposing side edge 30, thereby permitting the greatest variation in sizes and fits and requiring the least precision when fastening.

The exothermic heat source 18 preferably comprises a chemical warmer of which several types are known to the art and more fully disclosed in U.S. Pat. Nos. 1,434,576; 1,819,807; 1,901,313; 1,910,874; 2,157,169; 2,680,063; 3,301,250; 3,976,049; 4,114,591 and 4,366,804 and which are incorporated herein by reference. The relatively dry chemical warmer of the type disclosed in the Yamashita '049 patent and shown in FIGS. 3 and 4, which produces an exothermic chemical reaction due to the oxidation of a composition when exposed to air or oxygen, has proven suitable. A one ounce composition of iron powder, a chloride or sulfate salt of a metal having a greater ionization potential than the powdered iron (such as ferric sulfate), activated carbon, water, and a granulated insulating material such as expanded mica will easily produce temperatures of 60° C. (140° F.) for up to 6 hours when fully exposed, and may maintain temperatures above 0° C. (32° F.) for 72 hours or more depending upon the size of the heat source 18, the proportions or constituents in the composition, and the degree of exposure to the air. A two ounce composition comprising approximately 16% iron powder and 84% charcoal powder will produce similar high end temperatures for 20-24 hours when fully exposed, and will maintain temperatures effective for protecting citrus trees for much longer periods.

Figure 3:
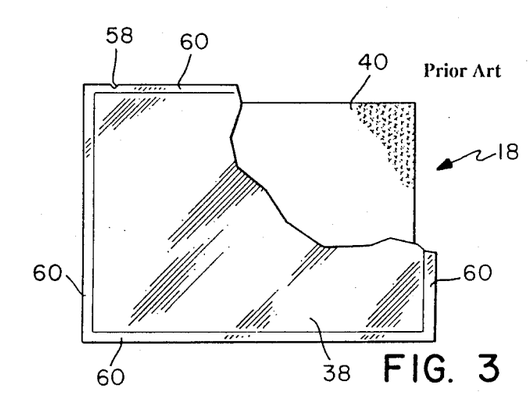
FIG. 3 is a view of the exothermic heat source of the prior art showing the external wrapper cut away and the dry chemical heat source contained therein.
Figure 4:
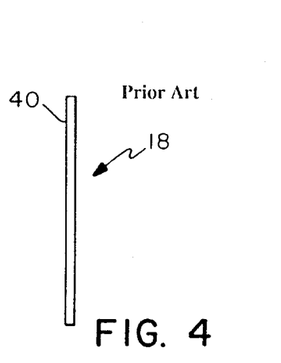
FIG. 4 is a side view of the exothermic heat source of the prior art removed from the external wrapper.

The normal use of such generally dry chemical warmers calls for them to be initially packaged in a substantially air-tight or generally air-impermeable plastic wrapper 38 under a vacuum which prevents oxidation, with the chemical composition being further enclosed in the interior cavity of a porous paper packet 40 as shown in FIG. 3. The composition within the packet 20 is exposed to circulating air by removing the wrapper 38 and frequently manipulating or molding and flexing the packet 40 in the hand of a user, thus increasing the rate of oxidation and decreasing the effective heat generating life of the composition.

In order to extend the effective heat generating period of the composition for use in protecting citrus trees 22, the packet 40 may be placed in a pocket 14 which restricts air flow to the packet 40, and which prevents movement or manipulation of the packet 40. Additionally, the wrapper 38 may be perforated with small holes or apertures to admit air rather than completely removing the wrapper 38 from the packet 40, by varying the porosity of the paper used to form the packet 40, and by altering the relative proportions of iron powder, activated carbon, and catalyzing salt. The protective pad 12 also restricts the flow of air to the packet 40, as well as providing an insulating barrier to retard or prevent the loss or dispersion of thermal energy away from the proximity of the trunk of the tree 22.

To further enhance the effectiveness of the protective device 10 by conserving excess initial heat, regulating and prolonging the transfer of heat from the heat source 18 to the tree 22, and providing for backup protection in the event of expiration of the chemical reaction within the heat source 28, an insulating jacket 20 may be interposed between the pad 12 and the tree 22.

Figure 5:
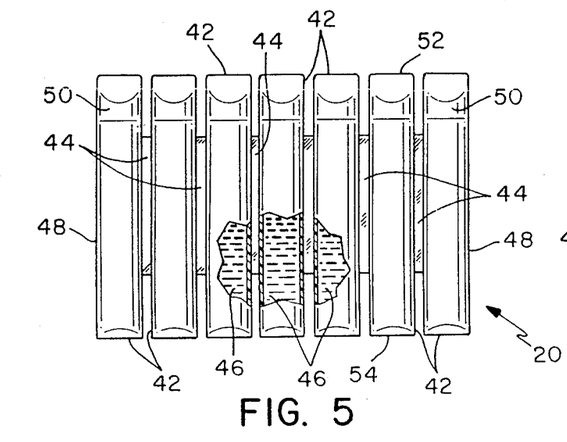
FIG. 5 is a front elevation view of one embodiment of the insulating jacket used in conjunction with the protective pad of FIG. 1.
Figure 6:
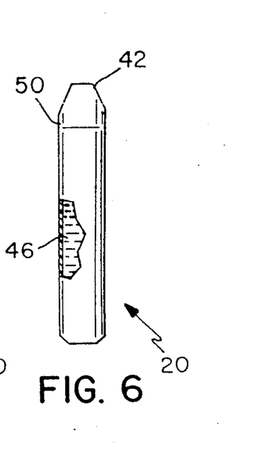
FIG. 6 is a side elevation view of the insulating jacket of FIG. 5.

Referring to FIGS. 1, 5, and 6, the insulating jacket 20 is comprised of a plurality of clear polyvinyl tubes 22 each having a diameter of approximately $\frac{1}{4}$" and a height of 10" and being interconnected side-by-side to form a flexible insulating jacket 20 by a plurality of web segments 44. The tubes 42 are each partially filled with an insulating fluid having a greater heat absorbing capacity per unit volume than air, such as water 46 or another liquid, semi-fluid, or gel having appropriate heat retention and heat dispersion characteristics, allowing an evacuated air space to permit growth and expansion of the tree 22 without adjusting the pad 0.2 once it has been secured around the tree 22, and to prevent bursting of the tubes 20 upon freezing of the water 46. The web segments 44 permit the jacket 20 to be flexed and removed even when the water 42 is frozen, and form gaps between the tubes 42 which allow for air circulation and prevent rotting and the accumulation of precipitation. The particular number and dimensions of the tubes 42 can be varied, although it is preferable that the jacket 20 be capable of being wrapped completely around the circumference of the tree 22 and with the opposing free side edges 48 of the jacket 20 overlapping, at least when initially applied to smaller diameter trees 22. The water 46 in each tube 42 may also contain in solution or suspension an aliquot of an ice seeding chemical such as silver iodide, silver nitrate, or phenazine to prevent supercooling of the water 46 in the event that no heat source 18 is present, or the chemical reaction expires prematurely.

In operation, the insulating jacket 20 is partially filled with water 46 such that the tubes 42 are predominantly rounded and the insulating jacket 20 is wrapped around the trunk of a young citrus tree 22 in the vicinity of and surrounding the budunion as shown in FIG. 1 by flexing the webs 44 connecting the tubes 42. The insulating jacket 20 is preferably wrapped so that the opposing free side edges 48 overlap one or more inches, and the interior facing surfaces 50 of the tubes 42 or the insulating jacket 20 contact the bark of the tree 22. The protective pad 12 is then partially wrapped around the exterior of the insulating jacket 20, with the top and bottom edges 26, 28 of the protective pad 12 extending above and below the top and bottom edges 52, 54, respectively, of the insulating jacket 20. The bottom edge 28 of the protective pad 12 should be adjacent to and contacting the ground 56 surrounding the base of the trunk of the tree 22 to prevent crawling insects and rodents from destroying the bark. A pesticide strip may also be fastened on the inside surface 16 of the pad 12, preferably near the top or bottom edges 26, 28 thereof.

The protective pad 12 may initially be secured in position around the insulating jacket 20 to await later use with the exothermic heat sources 18, or one or more exothermic heat sources 18 may be activated and positioned as the protective pads 12 are installed. To activate an exothermic heat source 18 of the type described above, the plastic outer wrapper 38 is torn along a notch 58 in the longitudinal and lateral welds 62 to tear the wrapper 38 open as shown in FIG. 3, the porous paper packet 40 containing the chemical composition is removed and kneaded in the hand of the user to allow air to penetrate the pores of the packet 40 and flow around the composition. The oxygen in the air then promotes an oxidation reaction in the composition, resulting in the production and release of a significant quantity of thermal energy from the packet 40 over a period of time.

Depending upon the thermal capacity and longevity of the packets 40, as well as the severity of the weather conditions, one or more of the packets 40 may be placed in the pockets 14 in the protective pad 12. The total number of packets 40 used, as well as their distribution within and the placement of the pockets 14, will depend, upon the type and level of development of the particular trees 22, the duration of protection required, the type of exothermic heat source 18 being used, the insulating qualities of the material used to fabricate the pockets 14, and the presence or absence of the insulating jacket 20. It is anticipated that in most circumstances a single exothermic heat source 18 will be sufficient, although between two and four pockets 14 are deemed preferable to accommodate the broadest variety of circumstances and maximize the size of the pockets 14 relative to the dimensions of the packets 40.

The protective pad 12 may then be secured in an upright and generally cylindrical protective position surrounding the tree 22 and insulating jacket 20, with the inner face 16 of the protective pad 12 contacting the exterior surface 62 of the insulating jacket 20 to support the insulating jacket 20 in an upright and generally cylindrical position, and the opposing ends 30 of the protective pad 12 overlapping one another. The protective pad 12 should securely hold the insulating jacket 20 in position, yet should not place inordinate pressure on the insulating jacket 20 nor restrict expansion of the insulating jacket 20 as the tree 22 grows. Moreover, the protective pad 12 should have sufficient flexibility to allow growth of the tree without frequent readjustments of the fastening means 34, 36, and should not exert so much force on the insulating jacket 20 to cause the gaps or spaces formed between the rounded tubes 42 along the webs 44 to close, and prevent precipitation or moisture from draining through the protective device 10.

The protective pad 12 is secured in place by overlapping contact of the hook and loop fasteners 34, 36, although any suitable fastener such as elastic, ties, or the like may be used. In other embodiments, the top edge 26 of the protective pad 12 may have upwardly extending flaps (not shown) which may be folded over the open top of the a cylindrical protective pad 12, or the open top may be enclosed or sealed in various manners such as by a plug (not shown). In some instances, it may be sufficient to permit the natural friction of the inner surface 16 of the protective pad 12 to hold the exothermic heat sources 18 in the predetermined positions, thus omitting the pockets 14 and allowing for greater variety in placement of the exothermic heat sources 18. In this case, an alternate insulating means such as the insulating jacket 20 should be incorporated, or the exothermic heat sources 18 should be designed so as to provide more uniform and lower temperatures than normally attained using the types of exothermic heat sources 18 described above.

A variety of different exothermic heat sources 18 may be used, ranging from self contained electrical heat generators to longer lasting gel heat sources and flameless or flame ignited combustible sources, as well as other suitable types of heat sources. Because of the variety of suitable exothermic heat sources 18 available, as well as the number of materials which may be utilized to form the protective pad 1,2 and pockets 14 and their diverse physical characteristics for heat retention or insulation, it is anticipated that many combinations of materials may be selected to provide sufficient or optima performance within varying degrees of practicality and expense, and that different embodiments may be selected based upon commercial utility and experimentation.

The protective pad 12 may be left in place while the exothermic heat sources 18 produce thermal energy to warm the tree 22 during frost producing weather conditions. In normal operation, the exothermic heat sources 18 will produce excess thermal energy within the first 2-3 hours of exposure to the air after activation, and the thermal energy will then taper off to a more stable but gradually decreasing amount over the next 20-72 hours. The initial excess thermal energy is transmitted through the insulating pocket 14 and absorbed by the water 46 in the insulating jacket 20, which prevents heat damage to the tree 22. This heat is then gradually released and transmitted to the tree 22, with a more uniform thermal gradient being. created as the exothermic heat sources 18, insulating jacket 20, and tree 22 approach thermal equilibrium. In the event the exothermic heat sources 18 expires prematurely, the thermal energy retained in the insulating jacket 20 will continue to be transmitted uniformly to the tree 22 for an extended period, and the heated water 46 will further provide protection from continued cold temperatures through the release of energy in the form of the molar heat of fusion upon freezing.

Once the threat of frost has passed, the active exothermic heat sources 18 may be removed from the protective pads 12 and disposed, or resealed in vacuum containers to permit their reuse if preferred. The protective pads 12 and insulating jackets 20 may be left installed on the trees in the upright protective position year round, to help prevent premature budding and as an ongoing protection against physical damage, pests, and frost. Additional activated exothermic heat sources 18 may be placed within the protective pads 12 at any time there is the threat of, a severe frost by unfastening the hook and loop fasteners 34, 36 and partially unwrapping the protective pad 22, and the protective pads and insulating jackets 20 may similarly be adjusted to accommodate the growth of the tree 22, and be completely removed when appropriate, such as for routine inspections or when the tree 22 has sufficiently matured.

While the preferred embodiments of the above protective device 10 has been described in detail above with reference to he attached drawing Figures, it is understood that the various changes and adaptations may be made in the protective device 10 without departing from the spirit and scope of the appended claims.

What is claimed is:

1. A protective device for protecting a tree from damage due to frost, said tree including a trunk or branch having a circumference, said protective device being applied to the tree by a user, said protective device comprising:
    an insulating protective pad, said protective pad having two opposing end edges and a length measured therebetween sufficient that said protective pad may be wrapped around the trunk or branch of the tree in a generally upright position and creating a barrier to retard the loss of thermal energy from the proximity of the trunk or branch of the tree;
    means for securing said protective pad in said generally upright position wrapped around the trunk or branch of the tree;
    at least one self-contained exothermic heat source which produces heat other than by the release of the latent heat of fusion of a liquid, said exothermic heat source being positioned between said protective pad and the trunk or branch of the tree and capable of selectively generating sufficient and sustained thermal energy over a prolonged period when activated by the user to warm the tree to a temperature above the freezing point of water and prevent frost damage to the tree; and
    means for securing said exothermic heat source at a predetermined position relative to said protective pad and the trunk or branch of the tree and enclosed within said protective pad.

2. The protective device of claim 1, wherein the protective pad has an inner surface when wrapped in the upright position around the tree, and wherein the means for securing the exothermic heat source at the predetermined position comprises:
    at least one pocket, said pocket being generally parallel and adjacent to the inner surface of the protective pad and formed from a section of sheet material and attached to the inner surface of the protective pad to define an enclosed region and an open region through which at least a portion of the exothermic heat source may be received into said enclosed region between said pocket and the protective pad.

3. The protective device of claim 2 wherein the section of sheet material forming the pocket has a top edge, a pair of opposing side edges, and a bottom edge, and wherein the opposing side edges and bottom edge of the pocket are attached to the protective pad to form the enclosed region between the pocket and the protective pad and the top edge of the section of sheet material forms the open region through which the exothermic heat source may be at least partially received into the enclosed region.

4. The protective device of claim 2 wherein the section of sheet material forming the pocket is a synthetic foam insulating material which is permeable to air.

5. The protective device of claim 4 wherein the section of sheet material forming the pocket is an open celled urethane-polyester.

6. The protective device of claim 4 wherein the section of sheet material forming the pocket is an open celled urethane-polyether.

7. The protective device of claim 4 wherein the section of sheet material forming the pocket is a closed-cell polyethylene.

8. The protective device of claim 1 wherein the protective pad is formed from sheet of urethane-polyester.

9. The protective device of claim 1 wherein the protective pad has an exterior surface opposing the inner surface and the trunk or branch of the tree when the protective pad is wrapped in the upright protective position, at least said outer surface of said protective pad being coated with a moisture repelling material.

10. The protective device of claim 1 wherein the protective pad has an exterior surface opposing the inner surface and the trunk or branch of the tree when the protective pad is wrapped in the upright protective position, said outer surface having a generally dark color.

11. The protective device of claim 1 wherein the exothermic heat source comprises:
    a packet having an interior cavity containing a generally dry chemical composition, said packet being permeable to oxygen, said chemical composition producing thermal energy through an oxidation reaction when said packet and said chemical composition are selectively exposed to oxygen.

12. The protective device of claim 11 wherein the packet is initially enclosed and sealed within a substantially air-impermeable exterior wrapper, and the thermal energy producing reaction of the chemical composition is activated by selectively removing the packet from said protective wrapper.

13. The protective device of claim 11 wherein the packet is initially enclosed and sealed within a substantially air-impermeable exterior wrapper, and the thermal energy producing reaction of the chemical composition is activated by selectively perforating said protective wrapper to admit oxygen to the chemical composition through said wrapper.

14. The protective device of claim 11 wherein the generally dry chemical composition includes a powdered form or iron, a salt of a metal having a greater ionization potential than said powdered form of iron, carbon in activated form, and water.

15. The protective device of claim 14 wherein the generally dry chemical composition includes a granular insulating material.

16. The protective device of claim 14 wherein the salt is ferric sultate.

17. The protective device of claim 1 further comprising a flexible insulating jacket, said insulating jacket containing a fluid which absorbs greater quantities of heat per unit volume than air, said insulating jacket being wrapped around the trunk or branch of the tree and being disposed substantially between the exothermic heat source and the trunk or branch of the tree, whereby the fluid initially retards the transmission of thermal energy from the exothermic heat source to the trunk or branch of the tree, and thereby absorbs and retains said thermal energy and subsequently transmits said thermal energy to the tree over an extended period of time.

18. The protective device of claim 17 wherein the fluid s a liquid.

19. The protective device of claim 18 wherein the liquid is water.

20. The protective device of claim 18 wherein the liquid contains a catalysts to promote freezing of the liquid.

21. The protective device of claim 17 wherein the insulating jacket comprises a plurality of interconnected tubes, each tube being oriented in a generally upright position generally parallel with the trunk or branch of the tree.

22. The protective device of claim 1 wherein the protective pad has an exterior surface, and wherein the means for securing said protective pad in said generally upright position wrapped around the trunk or branch of the tree comprises a fastener having a loop portion and a hook portion which may be removably engaged with said loop portion, said hook portion being attached to the inner surface of the protective pad adjacent one of the opposing ends thereof, said loop portion being attached to said exterior surface of the protective pad adjacent the opposing end thereof.

23. A protective device for protecting a citrus tree from damage due to frost, said citrus tree having a budunion and a circumference, said protective device comprising:
- a protective pad, said protective pad having two opposing end edges and a length measured therebetween sufficient such that said protective pad may be wrapped around the trunk of the tree in a generally upright position proximate to and surrounding the budunion of the tree and creating a barrier to retard the loss of thermal energy from the proximity of the trunk of the tree;
- means for securing said protective pad in said generally upright position wrapped around the trunk of the tree;
- at least one generally self-contained exothermic heat source positioned between said protective pad and the trunk of the tree and capable of generating sufficient thermal energy when activated to warm the tree to prevent frost damage to the budunion of the tree, said exothermic heat source including a packet having an interior cavity containing a generally dry chemical composition, said packet being permeable to oxygen, said chemical composition producing thermal energy through an oxidation reaction when said packet and said chemical composition are selectively exposed to oxygen;
- a flexible insulating jacket, said insulating jacket containing a fluid which absorbs greater quantities of heat per unit volume than air, said insulating jacket being wrapped around the trunk of the tree and being disposed substantially between said exothermic heat source and the trunk of the tree such that said fluid initially retards the transmission of thermal energy from said exothermic heat source to the trunk of the tree, and thereby absorbs and retains said thermal energy and subsequently transmits said thermal energy to the tree over an extended period of time; and
- means for securing said exothermic heat source at a predetermined position relative to said protective pad and the trunk of the tree.

24. A protective device for protecting a portion of a citrus tree from damage due to frost, said protective device comprising:
- a protective pad, said protective pad having two opposing end edges and a length measured therebetween sufficient such that said protective pad may be wrapped around the portion of the tree and creating a barrier to retard the loss of thermal energy from the proximity of the portion of the tree;
- means for securing said protective pad around the portion of the tree;
- at least one generally self-contained exothermic heat source positioned between said protective pad and the portion of the tree and capable of generating sufficient thermal energy when activated to warm the portion of the tree to prevent frost damage, said exothermic heat source including a packet having an interior cavity containing a generally dry chemical composition, said packet being permeable to oxygen, said chemical composition producing thermal energy through an oxidation reaction when said packet and said chemical composition are selectively exposed to oxygen; and
- means for securing said exothermic meat source at a predetermined position relative to said protective pad.

25. The protective device of claim 24 further comprising:
- a flexible insulating jacket, said insulating jacket containing a fluid which absorbs a greater quantity of heat per unit volume than air, said insulating jacket being wrapped around the portion of the tree and being disposed substantially between said exothermic heat source and the portion of the tree such that said fluid initially retards the transmission of thermal energy from said exothermic heat source to the portion of the tree, and thereby absorbs and retains said thermal energy and subsequently transmits said thermal energy to the portion of the tree over an extended period of time.

26. A method of protecting a citrus tree from damage due to frost, said citrus tree having a trunk or branch with a circumference, said method comprising the steps of:
- wrapping the citrus tree in a protective pad which retains thermal energy in the proximity of the trunk or branch of the tree and retards the loss of thermal energy from the proximity of the trunk or branch of the tree;
- activating at least one generally self-contained exothermic heat source, said exothermic heat source including a packet having an interior cavity containing a generally dry chemical composition, said packet being permeable to oxygen, said chemical composition producing thermal energy through an oxidation reaction when said packet and said chemical composition are selectively exposed to oxygen;
- positioning said exothermic heat source in a predetermined position between said protective pad and the trunk or branch of the tree with said exothermic heat source generating sufficient thermal energy when activated to warm the tree to prevent frost damage to the tree; and
- securing said protective pad in position wrapped around the trunk or branch of the tree.

27. A method of protecting a citrus tree from damage due to frost, said citrus tree having a trunk or branch with a circumference, said method comprising the steps of:
- wrapping an insulating jacket around the trunk of the tree, said insulating jacket containing a fluid which absorbs a greater quantity of heat per unit volume than air;

wrapping a protective pad around the trunk or branch of the tree, said protective pad retaining thermal energy in the proximity of the trunk or branch of the tree and retarding the loss of thermal energy from the proximity of the trunk or branch of the tree;

activating at least one generally self-contained exothermic heat source, said exothermic heat source including a packet having an interior cavity containing a generally dry chemical composition, said packet being permeable to oxygen, said chemical composition producing thermal energy through an oxidation reaction when said packet and said chemical composition are selectively exposed to oxygen;

positioning said exothermic heat source in a predetermined position between said protective pad and said insulating jacket with said exothermic heat source generating sufficient thermal energy when activated to warm the tree to prevent frost damage to the tree, said fluid initially retarding the transmission of thermal energy from said exothermic heat source to the trunk or branch of the tree, and thereby absorbing and retaining said thermal energy and subsequently transmitting said thermal energy to the trunk or branch of the tree over an extended period of time; and securing said protective pad and said insulating jacket in position wrapped around the trunk or branch of the tree.

* * * * *